(12) United States Patent
Lu et al.

(10) Patent No.: US 11,238,103 B2
(45) Date of Patent: Feb. 1, 2022

(54) BINARY CODING FOR IMPROVED SEMANTIC SEARCH

(71) Applicant: eBay Inc., San Jose, CA (US)

(72) Inventors: Qing Lu, Santa Clara, CA (US); Aimin Guo, San Jose, CA (US); Hao Zhang, San Jose, CA (US)

(73) Assignee: EBAY INC., San Jose, CA (US)

( * ) Notice: Subject to any disclaimer, the term of this patent is extended or adjusted under 35 U.S.C. 154(b) by 110 days.

(21) Appl. No.: 16/570,899

(22) Filed: Sep. 13, 2019

(65) Prior Publication Data
US 2021/0081462 A1  Mar. 18, 2021

(51) Int. Cl.
*G06F 16/903* (2019.01)
*G06F 16/9032* (2019.01)
*G06N 3/04* (2006.01)

(52) U.S. Cl.
CPC .......... *G06F 16/90344* (2019.01); *G06F 16/90332* (2019.01); *G06F 16/90339* (2019.01); *G06N 3/049* (2013.01)

(58) Field of Classification Search
None
See application file for complete search history.

(56) References Cited

U.S. PATENT DOCUMENTS

| 7,299,247 | B2 | 11/2007 | Calistri-Yeh et al. | |
|---|---|---|---|---|
| 8,165,414 | B1* | 4/2012 | Yagnik | G06F 16/41 |
| 8,446,261 | B2* | 5/2013 | Chatani | G06F 16/903 |
| 8,543,598 | B2 | 9/2013 | Udupa et al. | |
| 9,715,495 | B1* | 7/2017 | Tacchi | G06F 16/358 |
| 10,482,336 | B2* | 11/2019 | Burge | G06F 16/367 |
| 2006/0106767 | A1* | 5/2006 | Adcock | G06F 16/31 |
| 2010/0036829 | A1* | 2/2010 | Leyba | G06F 16/3344 |
| | | | | 707/739 |
| 2016/0042296 | A1* | 2/2016 | Shan | G06F 16/3329 |
| 2017/0032035 | A1* | 2/2017 | Gao | G06F 16/3347 |
| 2018/0052929 | A1* | 2/2018 | Liu | G06F 16/951 |
| 2018/0240013 | A1* | 8/2018 | Strope | G06F 16/335 |
| 2018/0300429 | A1* | 10/2018 | Barouni Ebrahimi | |
| | | | | G06F 16/9014 |

(Continued)

OTHER PUBLICATIONS

Cao, et al., "Deep Cauchy Hashing for Hamming Space Retrieval", Retrieved from the internet: <http://ise.thss.tsinghua.edu.cn/~mlong/doc/deep-cauchy-hashing-cvpr18.pdf>, 2018, 9 pages.

(Continued)

*Primary Examiner* — Son T Hoang
(74) *Attorney, Agent, or Firm* — Shook, Hardy & Bacon L.L.P.

(57) ABSTRACT

In some aspects, a query for one or more items is received. The query includes a plurality of terms. It is determined that a search result candidate is semantically similar to the query based at least in part on a distance between a first vector that represents the query and a second vector that represents the search result candidate in semantic space. The first vector and the second vector can each correspond to a single vector of binary values. Based at least in part on the determining that the search result candidate is semantically similar to the query, the search result candidate may be caused to be displayed. The search result candidate can include at least a first term that has a same meaning as at least a second term of the query, and the first term and the second term may have a different structure.

20 Claims, 7 Drawing Sheets

(56) References Cited

U.S. PATENT DOCUMENTS

2019/0138615 A1* 5/2019 Huh .................. G06F 16/38
2019/0251595 A1* 8/2019 Ordentlich .......... G06F 16/9535

OTHER PUBLICATIONS

Cao, et al., "Deep Quantization Network for Efficient Image Retrieval", retrieved from the internet: <http://yue-cao.me/doc/deep-quantization-networks-dqn-aaai16.pdf>, China, 2016, 7 pages.

Cao, et al., "Deep Visual-Semantic Quantization for Efficient Image Retrieval", School of Software, 2017, 10 pages.

Cao, et al., "HashNet: Deep Learning to Hash by Continuation", School of Software, 2017, 11 pages.

Jiang, et al., "Deep Cross-Modal Hashing", National Key Laboratory for Novel Software Technology, 2017, 9 pages.

Lai, et al., "Simultaneous Feature Learning and Hash Coding with Deep Neural Networks", Department of Electronic and Computer Engineering, Apr. 14, 2015, pp. 1-9.

Li, et al., "Feature Learning based Deep Supervised Hashing with Pairwise Labels", National Key Laboratory for Novel Software Technology, Department of Computer Science and Technology, 2016, 7 pages.

Lin, et al., "Deep Learning of Binary Hash Codes for Fast Image Retrieval", Retrieved from the Internet URL: <http://www.iis.sinica.edu.tw/~kevinlin311.tw/cvprw15.pdf>, 2015, pp. 1-9.

Liong, et al., "Deep Hashing for Compact Binary Codes Learning", Advanced Digital Sciences Center, 2015, 9 pages.

Liu, et al., "Deep Supervised Hashing for Fast Image Retrieval", Key Laboratory of Intelligent Information Processing of Chinese Academy of Sciences (CAS), Institute of Computing Technology, CAS, Beijing, 100190, China, 2016, pp. 2064-2072.

Shan, et al., "Recurrent Binary Embedding for GPU-Enabled Exhaustive Retrieval from Billion-Scale Semantic Vectors", retrieved from the internet: <https://arxiv.org/abs/1802.06466>, Feb. 20, 2018, pp. 1-15.

Xia, et al., "Supervised Hashing for Image Retrieval via Image Representation Learning", Proceedings of the Twenty-Eighth AAAI Conference on Artificial Intelligence, 2015, pp. 2156-2162.

Xu, et al., "Convolutional Neural Networks for Text Hashing", Proceedings of the Twenty-Fourth International Joint Conference on Artificial Intelligence, Institute of Automation, 2015, 7 pages.

Yang, et al., "Supervised Learning of Semantics-Preserving Hash via Deep Convolutional Neural Networks", IEEE Transactions on Pattern Analysis and Machine Intelligence, Feb. 14, 2017, pp. 1-15.

Zhao, et al., "Deep Semantic Ranking Based Hashing for Multi-Label Image Retrieval", Center for Research on Intelligent Perception and Computing, Institute of Automation, 2015, pp. 1556-1564.

Zhu, et al., "Deep Hashing Network for Efficient Similarity Retrieval", Proceedings of the Thirtieth AAAI Conference on Artificial Intelligence (AAAI—2016), pp. 2415-2421.

* cited by examiner

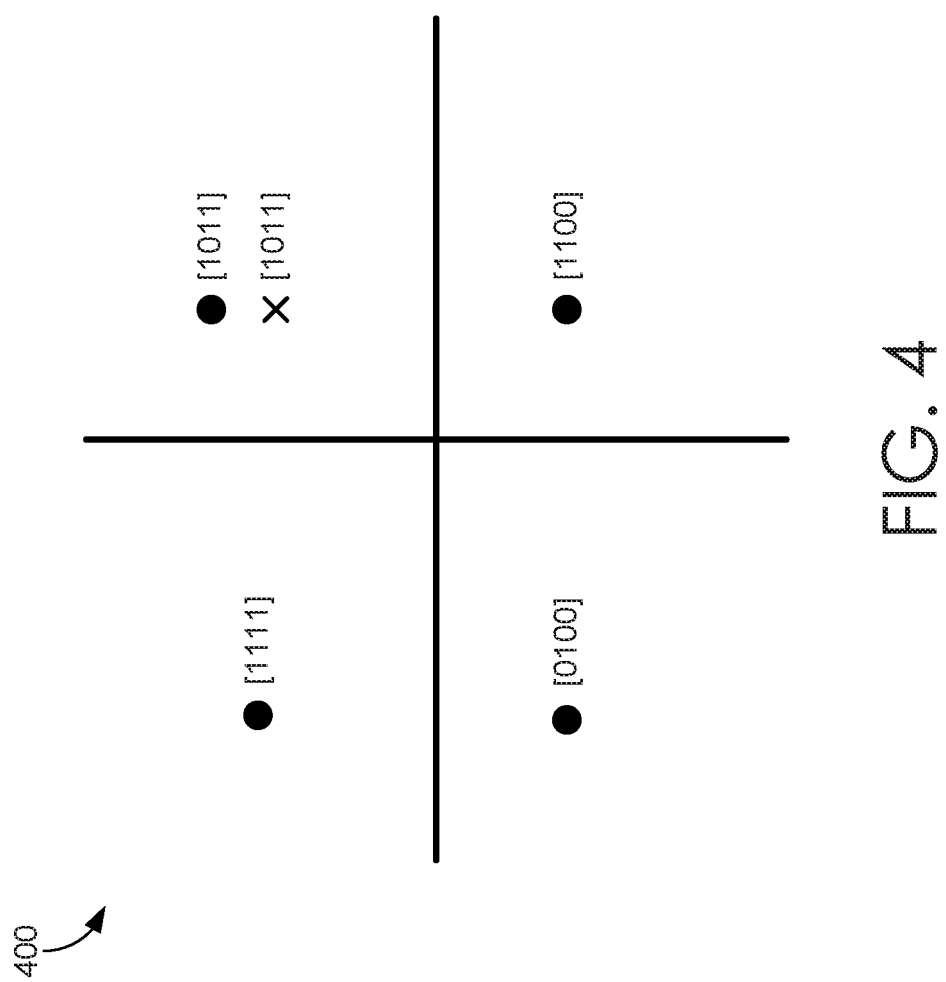

| RankBy | Relevance | ◆ | Query | Brand A sneakers | | Search |
|---|---|---|---|---|---|---|

511

| Image | Title | Price |
|---|---|---|
| | Brand A Shoes Men's Size 9.5 White Air Basketball 2003 New Vintage (322662755683) (15709) | 103.96 |
| | Brand A Men's Size 14 Black White Air Versatile II Basketball Sneakers Shoes F2-358 (273489046105) (15709) | 44.99 |
| | Brand A Air - Men's Size 12 -- Vintage -- Basketball footwear / footwear -- unused (273465351326) (15709) | 25.00 |
| | Brand A Men's White Athletic Basketball hightop Size 13 EUC 315134-130 (232933117186) (15709) | 49.95 |
| | Brand A Revolution 3 University Red Mens Running Sneakers Shoes 819300-601 (273370948177) (15709) | 46.95 |

BINARY CODING FOR IMPROVED SEMANTIC SEARCH

BACKGROUND

Users typically input one or more search terms as a query within a field of a search engine in order to receive information particular to the query. For example, after launching a web browser, a user can input search engine terms corresponding to a particular item, resource, or topic (e.g., documents, links, web pages, items for sale, etc.), and one or more servers hosting the search engine logic can obtain data from various data sources and cause a web page to display various ranked results associated with the particular item, resource, or topic. The user may then select one or more of the various ranked result identifiers.

Search engine logic typically matches terms in the query to terms as found within result candidate data sets and ranks the results for display based on the matching. For example, some technical solutions employ term frequency-inverse document frequency (TF-IDF) algorithms. TF-IDF algorithms include numerical statistics that infer how important a query word or term is to a data set. "Term frequency" illustrates how frequently a term of a query occurs within a data set (e.g., a digital document, a blog post, a database, etc.), which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query.

BRIEF SUMMARY

Particular embodiments of the present disclosure include a computer-implemented method, a non-transitory computer storage medium, and a system. Some aspects are directed to improving search technologies by generating search results based on semantic similarity between the query and search result candidates, converting the query and search result candidates to binary vectors, and determining a distance between the vectors in semantic space. In this way, computing resource consumption, such as memory consumption, is improved by using binary vectors and more relevant search results are returned when they are based on semantic similarity. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 4 is a schematic diagram that represents a binary code semantic space embedding, according to particular embodiments.

FIG. 5 is a screenshot of a user interface illustrating search results that are semantically similar to the query, according to particular embodiments.

DETAILED DESCRIPTION

Figure 1:
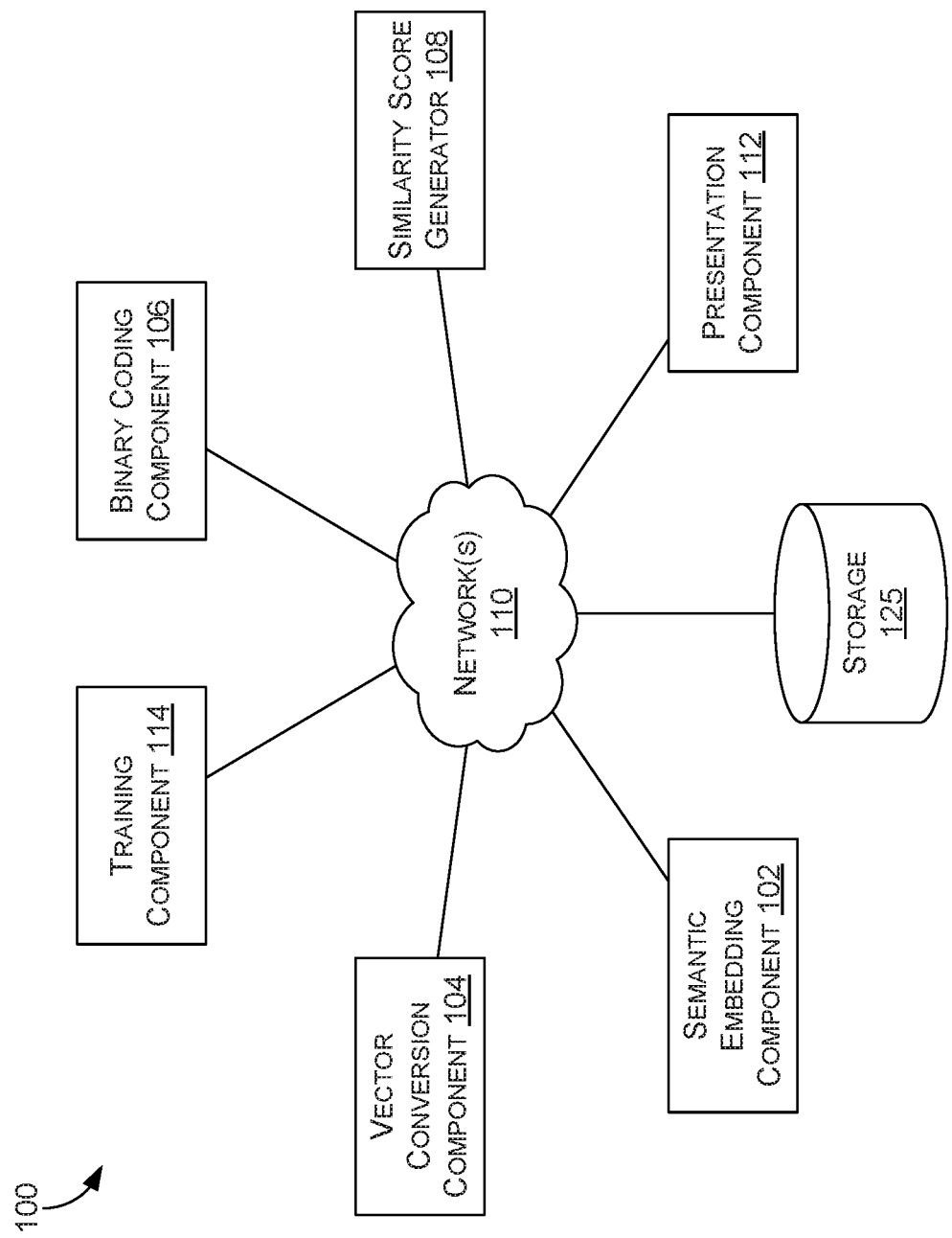
FIG. 1 is a block diagram of an illustrative system architecture in which some embodiments of the present technology may be employed, according to particular embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Conventional search engine logic uses keyword matching techniques (e.g., TF-IDF) or other techniques that do not reflect full user intent. These keyword matching techniques match terms in the query to terms in search result candidates based on word structure. However, term matching does not always elicit search results that captures user intent. Terms that are semantically similar (e.g., have the same or similar meaning) may reflect user intent but may not be used for generating search result candidates in existing search engine technologies because they do not match. For example, a query "Brand Z Shoes" may not surface a search result candidate that includes the term "Brand Z Sneakers" because "shoes" is morphologically different than "sneakers," even though they are semantically the same. Further, using conventional keyword matching techniques, terms that are not semantically similar may unnecessarily be provided in the search results. For example, a user can issue the query "zphone" and a high ranking search result can be provided, which reads "zphone case", which is not semantically identical to "zphone". Accordingly, the user intent may be to search for a particular phone but not a case of a phone. But because these keyword matching techniques are used, this intent may not be reflected in the search results.

Existing search engine software technologies are also costly in terms of CPU, memory, throughput, network latency, and execution functionality, among other things. For example, existing models (e.g., WORD2VEC) consume a lot of memory and are associated with increased network latency and decreased throughput. Even though some models have the capability of providing search results that are semantically similar to queries, they typically require very large dimensions of floating point numbers to be stored as vectors. A "vector" is an array or sequence of values that each represent a feature (e.g., word) in a vocabulary or data set (e.g., a group of words). Each floating point number is stored as a large quantity of bits that represent the scientific notation of the number. For example, a first bit may represent a sign (positive or negative) of the number, a second bit may represent the sign of the exponent, a third set of bits (e.g., 8 bits in a 32 bit system) may represent the magnitude or value of the exponent, and a fourth set of bits (e.g., 22 bits in a 32 bit system) may represent the magnitude or value of the mantissa (also known as the significand). In these systems, each term in a query can be represented in a vector that has hundreds if not thousands of dimensions and data sets. These vectors can include several floating point values. Not only does having so many dimensions with large data sets consume memory, but representing the values within each vector as floating point numbers consumes a lot of memory due to the bit storage requirements of the sign bits, the exponent bits, and the mantissa bits. Consequently, when these floating point numbers are used to execute a query and return search results, there is increased network latency, such as 1 to 5 seconds to return the search results. Further, because these floating point numbers are used to execute a query, there are less bits or packets that can be transmitted per unit of time, thereby decreasing throughput.

Embodiments of the present disclosure improve the existing search engine technologies and the functioning of a computer by implementing new functions or functionalities that are less costly in terms of CPU, memory, network latency, and/or throughput. For instance, various embodiments of the present disclosure generate search results based both on semantic similarity between the query and search result candidates, and techniques that output binary values (e.g., 0, 1) in a single vector that represents an entire query or search result candidate in semantic space, as opposed to averaging the vector of each term or storing multiple vectors that make up a query or search result candidate, where each vector contains floating point values. In this way, user intent may be more reflected when using semantic similarity, as opposed to word structure matching, less memory is consumed, there is increased throughput, and less network latency, as described in more detail herein.

In accordance with various embodiments of the present disclosure, a query that includes a plurality of terms (e.g., words) is received. For example, the query can be "Brand C sunglasses low price," where "brand C" is a first term, "sunglasses" is a second term, "low" is a third term, and "price" is a fourth term. In some embodiments, in response to the receiving of the query, each term of the plurality of terms in the query is converted into a vector such that there are a plurality of vectors that each contain a set of non-binary values. And then the plurality of vectors can be mapped in semantic space. "Semantic space" in various embodiments includes vectors that each represent different queries and search result candidates. For example, using the illustration above, for the query "Brand C sunglasses low price," brand C may be converted to the vector [0, 2.36, 3, 5], sunglasses may be converted to the vector [3.456, 1, 2.33, 5], low may be converted to the vector [0, 1.34, 5, 4], and price may be converted to the vector [0, 3.45, 2, 4].

"Semantic space" as described herein correspond to vectors that represent queries, query terms, search result candidates, and/or search result candidate terms that are embedded or oriented in semantic space based on the semantic similarity between other vectors in the semantic space. For example, semantic space can include queries and search result candidates. "Semantic similarity" in some embodiments refers to whether words or other character sequences that are represented by the vectors have a similar meaning as determined by being within a distance (e.g., Euclidian distance, hamming distance) threshold between the words or character sequences. In various embodiments, semantic similarity disregards the structure between the words or character syntactic sequences. For example, the words "shoes" and "sneakers" are semantically identical and would be oriented in the exact location or substantially the same location in semantic space even though they have a different word structure. Conversely, the terms "poodle" and "noodle" would be oriented in a very different location in semantic space even though they have similar word structure.

In some embodiments, in response to the mapping of the plurality of vectors in the semantic space, the plurality of vectors are converted to a single vector via running the plurality of vectors through a neural network (e.g., an LSTM). For example, using the illustration above, the vectors [0, 2.36, 3, 5], [3.456, 1, 2.33, 5] [0, 1.34, 5, 4] and [0, 3.45, 2, 4] are converted to a single decimal (or floating) vector [−0.346, −0.23, 0.45, 0.67] between the values of −1 and 1. In some embodiments, each value of this single vector represents a term in the query "Brand C sunglasses low price."

In some embodiments, in response to the first vector being generated, it is changed to a binary code (a vector of binary values) such that each value (which is non-binary) in the first vector output by the neural network is changed to a binary value in semantic space. For example, using the illustration above, the [−0.346, −0.23, 0.45, 0.67] vector is changed to [0, 1, 0, 1]. In various instances each binary value of the plurality of binary values can represent a term of the plurality of terms.

A "binary code" or "binary hash" is a vector of binary values that together represent a character sequence, such as a query and/or search result candidate. Each binary value or set of binary values can represent a particular feature or term of the query or search result candidate. A "binary value" as described herein is a base-two number representation that only has two symbols, 0 and 1, which are bits. This is contrasted with other numbers, such as integers, floats, or decimals, which are base-ten representations where there are 10 symbols (0, 1, 2, 3, 4, 5, 6, 7, 8, and 9).

Binary codes maximize information carried by each bit, which allows for more compact representations in memory compared to real-valued descriptors (e.g., integers), which are stored in memory as groups of bits (e.g., 32) for a given real value as opposed to single bits for binary values. When data sets are extremely large, minimizing the storage overhead is crucial, which binary hashes allow. A decimal number or integer can occupy one byte (8 bits) or half a byte for each digit (e.g., positive numbers from 0 to 255) since there are 10 possible values for a digit (0-9), indicative of a base 10 representation. Conversely, binary values are memory storage efficient in that that they are only base-2 (0 or 1) representations. Effectively, binary values take only 1 bit (⅛th of a byte) to store a binary value. In an example illustration, a binary hash or vector may hold 2 bytes (or 16 bits) that can be used to store 15 1s and 0s plus a sign position (i.e., 15 binary values). For the equivalent in decimal values, the very same 2 bytes can hold a value of up to 32, 767 plus a sign bit. Accordingly, more values or data can be stored to the same amount of space using binary values, as opposed to integers, floating point values, decimal values, or any other non-binary values. Therefore, various embodiments of the present technology improve existing technologies by generating binary codes that represent queries and search result candidate because it improves memory storage. Moreover, binary codes allow for decreased latency because certain functionality associated with binary codes, such as computing a hamming distance and using XOR operations allow queries to be executed with minimal overhead, thereby decreasing latency. In various instances, using binary codes leads to increased throughput because the network has more bits available to perform other work per time slice given the compact representation of binary codes.

In some embodiments, in response to the converting of the single vector into another single vector of binary values, it is determined that a second vector of binary values representing a search result candidate is within a threshold distance of the single vector in the semantic space. For example, using the illustration above, it can be determined that one of the vectors (e.g., [0100]) is within a threshold distance to the vector [0101]. A distance (e.g., hamming distance) between any two vectors (or vector values) is determined based on the semantic similarity between the vectors regardless of their word structure similarity or syntax similarity. The closer vectors are in semantic space, the more semantically similar they are and vice versa. For example, for the query "Nike shoes", the closest vector can represent the item listing "Nike sneakers for sale". Based on determining that these vectors are within a threshold distance of each other, the corresponding search result candidate item listing (e.g., [0100]) can be displayed.

FIG. 1 is a block diagram of an illustrative search engine system architecture 100 in which some embodiments of the present technology may be employed. Although the system 100 is illustrated as including specific component types associated with a particular quantity, it is understood that alternatively or additionally other component types may exist at any particular quantity. In some embodiments, one or more modules may also be combined. It is also understood that each component or module can be located on the same or different host computing devices. For example, in some embodiments, some or each of the components within the search engine system 100 are distributed across a cloud computing system. In some embodiments, the system 100 illustrates executable program code such that all of the illustrated components and data structures are linked in preparation to be executed at run-time of a query.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

As discussed throughout, particular embodiments of the present disclosure are directed to generating search results based both on semantic similarity between the query and search result candidates and determining a distance between binary values (e.g., 0, 1) of vectors that represents an entire query or search result candidate in semantic space. In some embodiments, the semantic embedding component 102 processes a query and/or search result candidate through semantic space.

In some embodiments, semantic space may initially include a set of elements in a data set that together form query-search result pairs. "Query-search result pairs" may refer to different queries users have issued (e.g., "Brand A Watch") and the search results that were returned to the users for those queries (e.g., "Brand A watch model T for sale, $399"). Each element, character sequence, or word (e.g., "Brand A") within the query and search result candidate may be initially converted to a vector and oriented in semantic space based on its semantic similarity to other elements in semantic space. For example, for the query "Brand B shoes for sale," "Brand B" may be represented as a first vector, "shoes" may be represented as a "second vector", and "for sale" may be represented as a third vector. In various embodiments, each value of these vectors indicates whether an element or feature is present in the data set (e.g., the query-result pairs) and/or indicates the coordinates or magnitude of the feature for determining where the feature is mapped in semantic space. For example, an entire data set might have 10 words, one of which is Brand B. Accordingly, the vector for Brand B might initially encoded as [0, 0, 0, 1, 0, 0, 0, 0, 0, 0], where 1 indicates that Brand B is true or is presented, and 0 indicates that the other words in the data set are not present. This vector may also correspond to the location in multi-dimensional space (e.g., semantic space) that the vector is mapped to, as each feature and value of the feature may correspond to a particular coordinate in the multi-dimensional space. For example, in a two-dimensional space, where a vector is [0, 1.222], the 0 may represent an X-axis value, and the 1.222 may represent a Y-axis value such that the coordinates are 0 along the X-axis and positive 1.222 along the Y axis.

In some embodiments, the semantic space (without binary values) corresponds to a word embedding of any suitable model, such as GloVe or WORD2VEC. For example, the converting of the words or elements in a query may first be categorically one hot encoded to 1s and 0s and then output encoded as coordinate integers. In these embodiments, multiplying the one hot encoded value by a weight matrix (or using the one hot encoded values as keys to look within the weight matrix) to get the hidden layer output or coordinate can be performed. In some embodiments, however, the semantic space is not the word embedding vector model space of these models. Rather, the converting of these elements can, for example, convert words or other elements of a query or search result candidate directly to floating point values or coordinate integers (e.g., without one hot encoding).

In some embodiments, the queries that are received by the semantic embedding component 102 and processed through semantic space are runtime or online queries that occur in response to an established user session between user devices and server(s). Alternatively or additionally, in some embodiments, the search result candidates that are received by the semantic embedding component 102 and processed through semantic space are performed offline (non-real-time or runtime), such as those used for training or testing, as described in more detail herein.

The vector conversion component 104 converts a plurality of vectors that together represent a query and/or search result candidate into a single vector that represents the query and/or search result candidate. In various embodiments, the output of the semantic embedding component 102 is the mapping of each vector that represents a query and/or search result candidate in semantic space. In some embodiments, the vector conversion component 104 takes this output as its input to convert the vectors to a single vector. In some embodiments, the vector conversion component 104 is or includes a machine learning model, such as a neural network to complete this functionality. For example, in some embodiments, the vector conversion component 104 is a Long Short Term Memory (LSTM) neural network that uses one or more forget gates, peephole connections, full gradients, and/or other variants to convert the plurality of vectors to a single vector, which is described in more detail herein. The output of the vector conversion component 104 is a single vector per query and/or search result candidate in which each value of the vector represents a feature or term in the query and/or search result candidate that is in the semantic space. For example, for the query "Brand C shirt size X", the vector representation may be [0, 1, 0.35], where 0 represents the coordinate or plot value of "Brand C" in semantic space, and likewise 1 represents "shirt", and 0.35 represents "size X." In this way, in particular embodiments the semantic space used for converting natural language words or elements into vectors via the semantic component 102 is changed by representing entire queries and/or search result candidates as single vectors, as opposed to representing each term of a query/search result query as multiple vectors that together form a query and/or search result candidate. In various embodiments, unlike some existing technologies, the single vector output per query and/or search result candidate contains real values or integers, as opposed to floating values so that the model can be trained and/or tested before binary codes are generated, as described in more detail below.

The training component 114 is configured to tune or train a model associated with the vector conversion component 104 and/or the semantic embedding component 102. In some embodiments, the training component 114 receives the output of the vector conversion component 104 and trains the associated model before the binary coding component 106 performs its functionality. For example, an LSTM or other neural network model can be trained or tuned such that the semantic space reflects accurate semantic similarity between vectors or queries/search result candidates that are represented by the vectors. In this way training may occur such that the distances between these data points change. Accordingly, training or tuning may occur until the appropriate semantic similarity is formed between queries and search result candidates such that their vector representations are at appropriate distances that reflect the similarity.

In various embodiments, the training data used by the training component 114 is collected from click behavior data corresponding to a history of users and sessions where various users have made certain selections, queries, and the like. In some embodiments, the query-search result candidate pairs described above include the click behavior data where various users have issued queries and results have been returned. In some embodiments, there are positive query-title pairs corresponding to heavily selected/issued query/titles (e.g., queries and titles that have been issued/selected over a threshold quantity of times) and negative query-title pairs that are not often issued/selected (e.g., have not been issued/selected over the threshold). In some embodiments, the query-search result pairs are partitioned as training and test data, which in some instances is labeled as "relevant" or "non-relevant" by SME experts.

The binary coding component 106 converts each single vector representing a particular query and/or search result candidate to another single vector representing the same query and/or search result candidate, except that the vector is a vector of binary values. In some embodiments, for example, the binary coding component 106 receives the output of vector conversion component 104 (e.g., a query that is represented by decimals after it has been trained) and converts the values of the vector into binary codes or hashes, as will be described in further detail below.

In various embodiments, the output of the binary coding component 106 is a set of binary codes or hashes representing the particular queries and titles in the semantic space where each value (0 or 1) corresponds to a particular term or multiple of a search result candidate or query. Accordingly, the semantic space may include another change based on the conversion to binary codes or hashes, which includes a change in magnitude (e.g., 0.2 floating value to 1 in binary) in response to the conversion by the binary coding component 106. This converting into binary codes are described in more detail herein.

The similarity score generator 108 calculates the specific value of similarity between one or more vectors that represent one or more queries and one or more vectors that represent one or more search result candidates in semantic space. In some embodiments, the specific value of similarity is based on distance measures, such as Euclidian distance, hamming distance, etc. In some embodiments, the similarity score generator 108 computes a similarity score before any conversion of vectors from one form to another (e.g., as performed by the vector conversion component 104 and the binary coding component 106). For example, in response to the input of the query and/or search result candidate via the semantic embedding component 102 in semantic space, the similarity score generator 108 may determine distances between queries and search results candidates. Alternatively or additionally, in some embodiments, the similarity score generator 108 computes a similarity score in response to the binary coding component 106 converting each vector to binary values, such as a hamming distance between two binary vectors representing a query and search result candidate.

In some embodiments, the similarity scoring component 108 can compute a hamming distance between two binary codes or hashes. A "hamming distance" computation compares values at the same position between the vectors representing the query and the search result candidate to calculate which values are the same and which values are different. For example, there may be a binary code representing a query that reads [100110] and another binary code representing a search result candidate that reads [110011]. The difference between these codes is 3, which may be indicative of the "similarity score" that the score generator 108 generates. This may correspond to a query that is only 50% similar to the search result candidate. That is, for each of the 6 positions, there are 3 bits that are different and 3 bits that are the same—(e.g., the first position contains the same 1 bit, whereas the second position is different for both binary codes in that there is a 1 bit and a 0 bit represented)—which is very semantically dissimilar. Effectively, since each value (or set of values) in the binary code represents a term (or remembered term via a neural network) in the query and search result candidate," this means that there are 3 terms that are semantically identical or similar over a threshold and 3 terms that are not semantically identical or similar over a threshold. Any particular suitable value or percentage can be used as a threshold to determine whether queries and search result candidates (or terms/elements within the queries/search result candidates) are "semantically similar." For example, where there is a match in hamming distance in values of 80% or more (the threshold), this may reflect semantic similarity and anything below 80% is not semantically similar. In operation, an exclusive or (XOR) technique is conducted to compute hamming distance, which reduces latency for executing a query compared to existing solutions.

The presentation component 112 causes search results to be displayed or otherwise provided (e.g., via an auditory notification of a smart speaker) based on the results of the similarity score generator 108. For example, at runtime in response to a user initiating a session and issuing a query, the query can be run through semantic space via the semantic embedding component 102, the vector conversion component 104 can convert each term of the query into vectors of floating values, the binary coding component 106 can convert the vectors of floating values into a single vector of binary values, and a score can be generated via the similarity score generator 108, such that the search result candidates that are within a distance or score threshold in semantic space, can be ranked (based on the distance) and rendered as search results to a user device based on the scoring or ranking.

Example system 100 also includes storage 125. Storage 125 generally stores information including data, computer instructions (e.g., software program instructions, routines, or services), data structures, and/or models used in embodiments of the technologies described herein.

By way of example and not limitation, data included in storage 125, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; etc.) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, data or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Some embodiments of storage 125 may have stored thereon computer logic (not shown) comprising the rules, conditions, associations, classification models, and other criteria to execute the functionality of any of the components, modules, analyzers, generators, and/or engines of systems 200.

Figure 2:
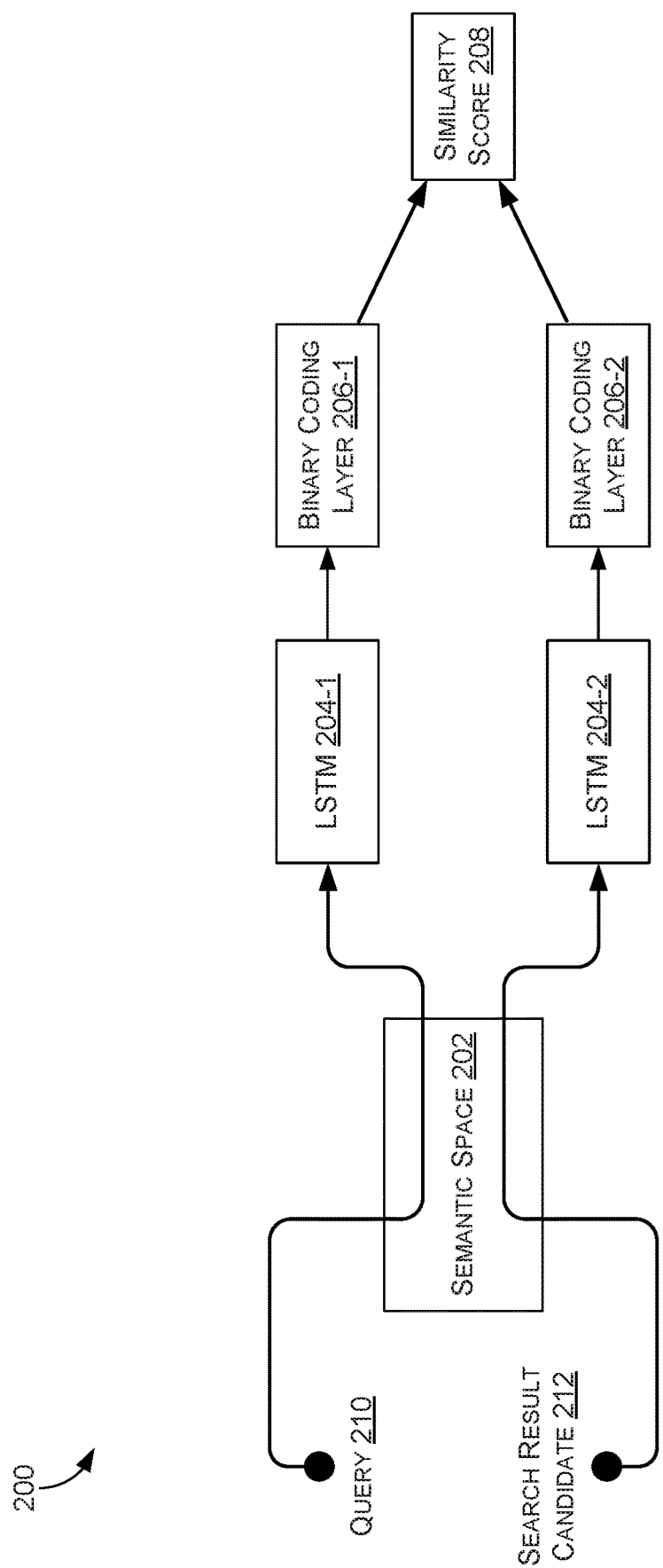
FIG. 2 is a block diagram of another illustrative system architecture in which some embodiments of the present technology may be employed, according to particular embodiments.

FIG. 2 is a block diagram of an example system architecture in which embodiments of the present disclosure are employed in, according to some embodiments. Although the system 200 is illustrated as including specific component types associated with a particular quantity, it is understood that alternatively or additionally other component types may exist at any particular quantity. In some embodiments, one or more modules may also be combined. It is also understood that each component or module can be located on the same or different host computing devices. For example, in some embodiments, some or each of the components within the search engine system 200 are distributed across a cloud computing system. In some embodiments, the system 200 illustrates executable program code such that all of the illustrated components and data structures are linked in preparation to be executed at run-time of a query.

System 200 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

The semantic space 202 is initially indicative of various vectors each representing a tokenized or parsed term of various queries and search result candidates that are embedded in the semantic space 202 based on the semantic similarity between the terms. In some embodiments, the semantic embedding component 102 is the component that maps the vectors in the semantic space 202, as described in more detail above with respect to FIG. 1. The query 210 and/or the search result candidate 212 is processed through the semantic space 202. In some embodiments, the search result candidate 212 represents offline inputs such that they are inputs for training, tuning, and/or testing a model (e.g., an LSTM) and not used at a user session at runtime. Alternatively, in some embodiments, the query 210 represents runtime or online inputs such that a user device establishes a session with one or more servers and inputs the query 210. In these embodiments, the search result candidate 212 would be run through the illustrated components first. And subsequently, after a user has started a session and issued the query 210, the query 210 would be run through the corresponding components online. Accordingly, some or each of the components in the system 200 may be implemented in offline and/or runtime environments.

After the query 210 and the search result candidate 212 are run through the semantic space 200, each of the vectors that represent the terms of the query 210 and search result candidate 212 are used as input to their respective LSTM models 204-1 and 204-2. In some embodiments, each of the LSTMs 204-1 and 204-2 represent the vector conversion component 104 of FIG. 1 (or two vector conversion components). The last hidden vector from the LSTMs 204-1 and 204-2 is used as a representation, in vector form, of the entire query 210 and search result candidate 212. In this way, the vectors that represent each term of the query 210 and the search result candidate 212 are aggregated, combined, or converted to respective single vectors (i.e., a first vector represents the query 210 and a second vector represents the search result candidate 212). The LSTM functionality is described in more detail below. Although LSTMs are used in the system 200, it is understood that this is illustrative only and that any suitable machine learning model can be used to convert the vectors to single vectors, such as Gated Recurrent Unit (GRU).

The binary coding layers 206-1 and 206-2 are layers that take the single vector outputs representing the query 210 and the search result candidate 212 produced by the respective LSTM 204-1 and 204-2 and convert each of the values within the single vectors to binary values. In some embodiments, single vectors produced by the LSTMs 204-1 and 204-2 are processed through the binary coding layers 206-1 and 206-2 (e.g., fully connected layers) with tan h( ) as an activation function, which is described in more detail below. This ensures that that the values of the output of the binary coding are constrained between [−1, 1], where 1 is output if the value is positive and 0 is output if the value is negative (making it a binary value). In some embodiments, the binary coding layer 206-1 and/or 206-2 represents the binary coding component 106 of FIG. 1.

In response to the single vectors being processed through the binary coding layers 206-1 and 206-2, the binary vectors that represent the query 210 and search result candidate 212 are compared and scored with the similarity score 208. In some embodiments, the similarity score 208 is produced by the similarity score generator 108. In an illustrative example, a hamming distance between two binary vectors can be computed to determine the similarity. If the score or distance is a value within a threshold, the search result candidate 212 is determined to be semantically similar to the query 210. Conversely, if the score or distance is a value outside of the threshold, the search result candidate 212 is determined not to be semantically similar to the query 210. In various instances, the similarity score 208 is directly related or proportional to the ranking of the search result candidate 212, such as on a search result page when a user issues the query 210 or similar query. For example, in response to a user issuing the query 210, the system 200 can execute the query 200 and provide the search result candidate 212 for display on a user device of the user in a first top position indicative of the similarity score 208 being the highest score or the most semantically similar to the query 200 compared to other search result candidates.

Figure 3:
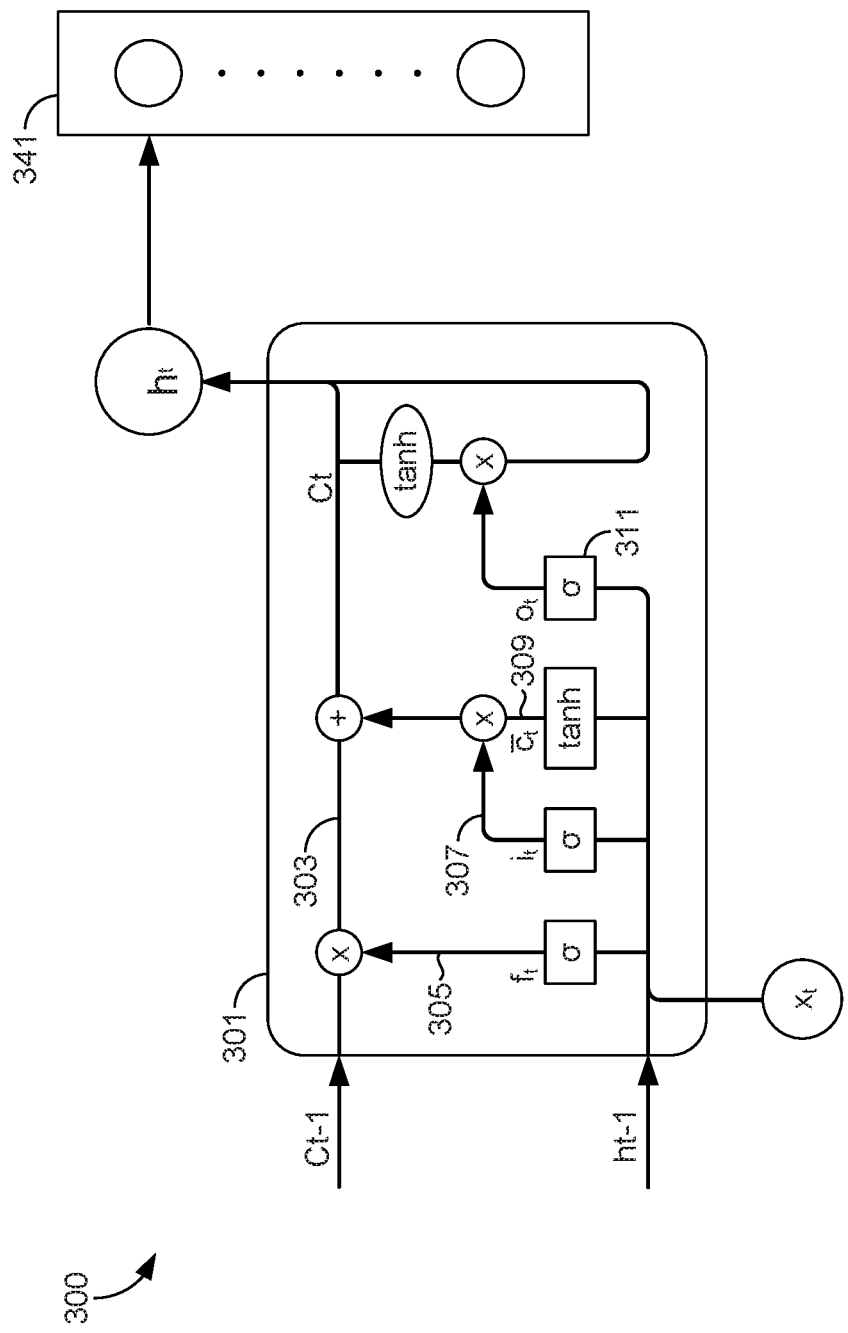
FIG. 3 is a schematic diagram illustrating how binary codes are generated, according to particular embodiments.

FIG. 3 is a schematic diagram illustrating how binary codes are generated, according to some embodiments. Although FIG. 3 illustrates specific components (e.g., an LSTM), algorithms, and equations, it is understood that this is illustrative only and that any quantity or type of suitable components can exist. For example, in some embodiments, other neural network algorithms (e.g., GRU) can be alternatively used instead of an LSTM. In some embodiments, FIG. 3 illustrates the flow of the query 210 and/or the search result candidate 212 through both the LSTM 204-1/204-2 (or the vector conversion component 104) and the binary coding layer 206-1/206-2 (or the binary coding component 106) in according with FIGS. 1 and 2 described above.

FIG. 3 illustrates how a vector representing each term or set of terms in a query and/or search result candidate is run through a neural network and then through a binary coding layer to represent the query and/or search result candidate as binary codes. Element or cell 301 represents a vector representing term or set of terms (e.g., the last term) in a query or search result candidate. Although FIG. 3 illustrates a single term or set of terms (elements 301), it is understood that this is representative only and there may be more or less terms than this. In an illustrative example, a query may read, "Brand C shoes for sale," where "sale" may be a vector representing element 301. In some embodiments, the other terms (e.g., "Brand C" and "shoes") represent other cells or elements similar to the element 301. In this way, each term of the query is processed similarly and data can be passed on sequentially from one word to another, as described herein.

The cell state 303 corresponds to selective memory of past cell states (i.e., it takes data (e.g., vector values) that has been forgotten or disregarded and data that has been remembered or preserved) and passes on remembered data to the next cell or step. When data arrives at the last cell (representing the last term or set of terms in the query/search result candidate), $C_t$ is linearly combined with $h_{t+1}$ such that $h_{t+1}$ is the final output that gets passed to the activation layer 341, as described in more detail below.

In various embodiments, the first operation occurs when the forget gate layer 305 (a sigmoid layer) determines what vector values gets removed from the cell state 303, as represented by $f_t = \sigma(W_f \cdot [h_{t-1}, x_t] + b_f)$. It takes $h_{t-1}$ (the previous cell state corresponding to a previous sequential term (e.g., the word "for" in the phrase "for sale")) and $x_t$ (current vector values) and outputs a number between 0 and 1. A value close to or within a threshold of value of 1 indicates true or keep this data while a 0 or value within a threshold value of 0 indicates forget or get rid of the data. A previous cell state indicates all the vector values that were passed from the previous cell.

In various embodiments, the next operation is to determine what information will be stored or moved along the cell state 303, as represented by $i_t = \sigma(W_i \cdot [h_{t-1}, x_t] + b_i)$; $\overline{C}_t = \tan h(W_C \cdot [h_{t-1}, x_t] + b_C)$. This occurs via the input gate layer 307 (another sigmoid layer) and the tan h layer 309. The gate layer 307 determines which vector values will be updated and the tan h layer 309 generates a single vector of new candidates $C_t$. In an example illustration, the model may remove or forget values of vectors for a given query that represent other words in a vocabulary or data set that are not part of the query or search result candidate but keep words which are still part of the vector representation of a word. Alternatively or additionally, the system can forget words or vector representations that do not have significant meaning, such as the word "the" or "and," for example.

The process then updates the old cell state 303 ($C_{t-1}$) into the new cell stat $C_t$, as represented by $C_t = f_t * C_{t-1} + i_t * \overline{C}_t$. Accordingly, the old cell state ($C_{t-1}$) is multiplied by 305, forgetting the vectored values described above. Then, the input gate layer 307*the tan h layer 309 is added. In the last step, it is determined what is outputted, which is represented by $o_t = \sigma(W_o[h_{t-1}, x_t] + b_o)$; $h_t = o_t * \tan h (C_t)$. The output is based on the new cell state $C_t$, which is a filtered version of the cell state. A sigmoid layer determines what parts of the cell state 303 ($C_{t\_}1$) will be output. The cell state 303 is run through tan h so that the values are between −1 and 1, represented by the final output $h_t$. And this is multiplied by the sigmoid gate 311 so only the necessary values are outputted. Accordingly, the output of the cell 301 (assuming that this is the last term of the query/search result candidate) is a single vector where each value of the vector is a non-binary (e.g., float, integer, decimal) between −1 and 1 and where each value represents a term in the query or search result candidate.

In some embodiments, between the output $h_t$ and the fully connected layer 341, there is a step between them that takes the sign of each numbers in $h_t$ to generate binary values. The fully connected layer 341 receives the single vector of values output ($h_t$) representing query/search result candidate between −1 and 1 as input and generates binary codes (e.g., 0 or 1) for each value of the single vector as output. For example, the generating of the binary codes may be illustrated by the equation, Sign($h_t$*M), where M is a 2-dimensional matrix. $h_t$*M denotes the matrix multiplication of $h_t$. The output is another single output, and thus this equations transforms the output $h_t$ to a binary vector. Sign( ) is the element-wise sign function, which outputs 1 if the value is positive and 0 if it is not positive, thus being a binary value. In some embodiments, the functionality described below with respect to the fully connected layer 341 is performed by the binary coding component 106 of FIG. 1.

FIG. 4 is a schematic diagram that represents a binary code semantic space embedding 400, according to embodiments. In some embodiments, the binary code semantic space embedding represents the final output of the fully connected layer 341 of FIG. 3 (and/or the semantic space 202 of FIG. 2 after the binary encoding layers 206 perform their functionality) or any semantic space described herein. Specifically, the binary code semantic space embedding 400 includes multiple vectors that have binary values, where each vector represents a query or term. In some embodiments, each binary value within each vector represents a term (or set of terms) in the query or search result candidate. For example, as illustrated in FIG. 4, the vector [1011] can represent a query that reads "Brand A sunglasses low price" where Brand A is represented by binary value 1, sunglasses is represented by binary value 0, low is represented by binary value 1 and price is represented by binary value 1.

FIG. 4 illustrates various search result candidates represented by the dots (i.e., [1111], [1011], [0100], [1100]) and the lone query is represented by the x (i.e., [1011]). The semantic space 400 illustrates that the closest (e.g., in hamming distance) search result candidate to the query [1011] is the search result candidate [1011] indicating that they both have identical semantic similarity. In an illustrative example, a user may issue a query represented by the vector [1011] and the final output may be search results in ranked or scored order based on the distance shown in the semantic space 400—that is, the search result candidate [1011] is ranked first on a result page (e.g., top-most oriented entry) since it is the closest to the query, the search result [1100] is ranked second since it is the second closest, the search result [1111] is ranked third since it is the third closest, and the search result [0100] is ranked last since it is furthest away from the query.

FIG. 5 is a screenshot 500 of a user interface illustrating search results that are semantically similar to the query, according to some embodiments. In some embodiments, the screenshot is provided by the presentation component 112 of FIG. 1. In some embodiments, the screenshot 500 represents the final output after binary codes have been generated (e.g., by the fully connected layer 341 and/or binary coding component 106) and a similarity score has been generated (e.g., by the similarity score generator).

FIG. 5 represents particular runtime embodiments where a user device has established a communication session with one or more platforms (e.g., an electronic marketplace) and issues a query to receive search results. For example, a user may open up a web browser client application on a user device and input an electronic marketplace URL, which causes a session to be established between one or more servers associated with the electronic marketplace and the user device. The user may then input the query "Brand A sneakers" into the search engine search field 511. In response to this input, the one or more servers may perform the functionality as described herein, such functionality described with respect to the semantic embedding component 102, the vector conversion component 104, the binary coding component 106, the similarity score generator 108, and the presentation component 112. For example, each word of the query "brand A sneakers" may first be converted to vectors of floating numbers or integers, and all consolidated (e.g., via the cell 301 functionality or LSTM) to form a single vector representing the query, and then finally converted to a binary single vector (e.g., via the fully connected layer 341). After a score is computed to determine what vectors representing the search results in FIG. 5 are generated (e.g., via the similarity score generator 108), the search result candidates 501, 503, 505, 507, and 509 are all provided for display. Each search result candidate shows semantically similar or identical closeness to the query. For example, the query includes the term "sneakers" and the search result candidates include semantically similar words, such as "shoes", "footwear", "high top", etc.

Figure 6:
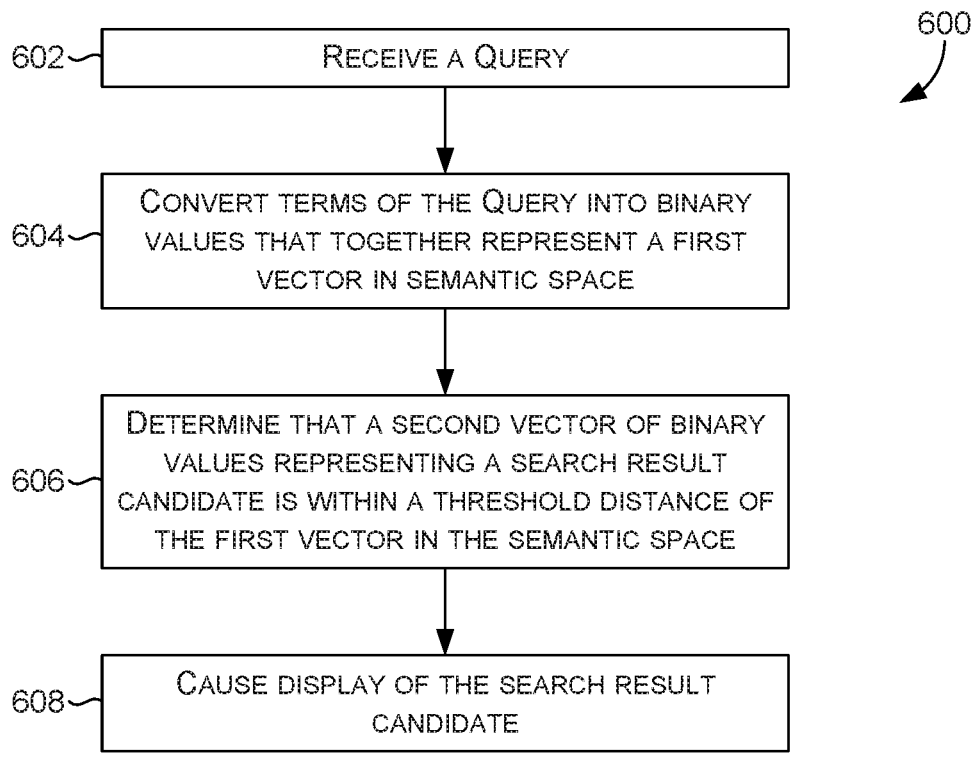
FIG. 6 is a flow diagram of an example process for generating search results via semantic space of binary vectors, according to particular embodiments.

FIG. 6 is a flow diagram of an example process 600 for generating search results via semantic space of binary vectors, according to embodiments. The process 600 (and/or any operation described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 600 and/or any other functionality described herein.

Per block 601, a query is received (e.g., by the semantic embedding component 102). The query can be received at a search engine for one or more items (e.g., product listings, search results, documents, etc.). In some embodiments, the query includes a plurality of terms (e.g., words or symbols). For example, the query can be "Brand C sunglasses low price," where "brand C" is a first term, "sunglasses" is a second term, "low" is a third term, and "price" is a fifth term. In some embodiments, a user can open a client application, such as a web browser, and input a particular Uniform Resource Locator (URL) corresponding to a particular web site or portal. In response to receiving the user's URL request, an entity, such as one or more servers associated with an electronic marketplace may provide or cause to be displayed to a user device. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the views represent an aspect of a locally stored application, such that a computing device hosts the entire application and consequently the computing device does not have to communicate with other devices to retrieve data.

In some embodiments, a search result candidate is alternatively or additionally received at block 602, as illustrated, for example, in FIG. 2 where the search result candidate 212 is received and processed. In some embodiments, a user may select a search result candidate at runtime after a session has started. Alternatively, in some embodiments, this may be an offline process where a user is testing or otherwise transforming a search result candidate into binary vectors in preparation for real-time queries. Accordingly, in some embodiments, each of the blocks 602-608 alternatively or additionally represents a search result candidate instead of just a query as illustrated in FIG. 6.

Per block 604, terms of the query are converted (e.g., via the binary coding layer 201-1) into binary values that together represent a first vector (e.g., the vector [1011] in the space 400). In some embodiments, in block 604 each term of the plurality of terms are converted into a binary value (e.g., a 1 or 0] to form a plurality of binary values where the plurality of binary values are represented together as a first vector within semantic space (e.g., the vector [1011] in the space 400). In some embodiments, a distance between each vector in the semantic space is determined based at least in part on words that have a same meaning (e.g., sneaker and shoe) without regard to whether the words are structurally or morphologically similar. In various embodiments, the first vector represents the query. For example, using the illustration above, the query "Brand C sunglasses low price" can be represented as [00100] where each binary value corresponds or represents a term of the query.

In some embodiments, there are intermediate blocks or operations between blocks 602 and 604. For example, in response to the receiving of the query at block 602, each term of the plurality of terms in the query is converted (e.g., via the semantic embedding component 102) into a vector such that there are a plurality of vectors that each contain a set of floating (or other non-binary) values. And then the plurality of vectors can be mapped (e.g., prior to determining that a search result candidate is semantically similar to a query) in semantic space. For example, using the illustration above, for the query "Brand C sunglasses low price," brand C may be converted to the vector [0, 2.36, 3, 5], sunglasses may be converted to the vector [3.456, 1, 2.33, 5], low may be converted to the vector [0, 1.34, 5, 4], and price may be converted to the vector [0, 3.45, 2, 4]. The query 210 being run through and mapped in the semantic space 202 is also another example of this functionality.

In some embodiments, there are yet other intermediate steps between blocks 602 and 604. For example, in response to the mapping of the plurality of vectors in the semantic space, the plurality of vectors are converted (e.g., by the vector conversion component 104) to a single vector via running the plurality of vectors through a neural network (e.g., an LSTM), such as described with respect to the LSTM 204-1 and the cell 301. For example, using the illustration above, the vectors [0, 2.36, 3, 5], [3.456, 1, 2.33, 5] [0, 1.34, 5, 4] and [0, 3.45, 2, 4] are converted to a single floating vector [−0.346, −0.23, 0.45, 0.67]. In some embodiments, each value of this single vector represents a term in the query "Brand C sunglasses low price." In these embodiments, the running the vector of values (e.g., floating values) through a neural network includes combining the plurality of vectors to a single vector where each value in the single vector represents a term of the plurality of terms, and wherein the converting each term of the plurality of terms into a binary value at block 604 includes changing the first vector to a single vector (or vice versa) such that each value in the single vector or first vector is changed to the binary value of the single/first vector. Based on the processing the plurality of vectors that represent the plurality of terms through a neural network, the first vector can be generated in semantic space where the first vector includes a plurality of binary values. Each binary value of the plurality of binary values can represent a term of the plurality of terms. In some embodiments, the semantic space is an embedding that includes a plurality of vectors each representing search result candidates and queries such that they both share the same semantic space, as illustrated, for example, in FIG. 2 and FIG. 4.

Per block 606, it is determined (e.g., by the similarity score generator 108) that a second vector of binary values representing a search result candidate is within a threshold distance of the first vector in the semantic space. Put another way, it is determined (e.g., via hamming distance) that a search result candidate is semantically similar to the query based at least in part a distance between the first vector that represents the query and a second vector that represents the search result candidate in semantic space. The first vector and the second vector each corresponds to a single vector of binary values. Thus it is determined that the second vector is within a threshold distance of the first vector in semantic space where the second vector represents a search result candidate for the query and each (or some) term of the search result candidate is represented as another binary value within the semantic space.

In an illustrative example, referring back to FIG. 4, it can be determined that the vector representing the search result candidate [1011] is within a threshold distance from the vector representing the query [1011]. In yet another example of block 606, the similarity score 208 of FIG. 2 can be generated.

In some embodiments, the determining that the search result candidate is semantically similar to the query includes computing a hamming distance between the second vector and the first vector, as described herein. Alternatively or additionally, in some embodiments, the determining that the search result candidate is semantically similar to the query request is further based on computing a dot product scalar between the first vector and the second vector, as described herein with respect to the fully connected layer 341 of FIG. 3. In some embodiments, the determining that the second vector is within the threshold distance of the first vector within semantic space includes using an XOR operation to compute a hamming distance between the second vector and the first vector, as described above with respect to the fully connected layer 341 of FIG. 3. In some embodiments, the search result candidate is indicative of a title of an item for sale in an electronic marketplace. For example, the search result candidate might be a title that reads "Brand X gloves for sale $20." Similarly, in some embodiments, the query is indicative of a request associated with the same item. For instance, using the example above, the query might be "Brand X gloves."

Per block 608, the search result candidate is caused (e.g., by the presentation component 112) to be displayed (e.g., to a user device). In various embodiments, based at least in part on the determining that the search result candidate is semantically similar to the query, the search result candidate (that includes at least a first term that has a same meaning as at least a second term of the query) is caused to be displayed even though the first term and the second term have a different word structure. Put another way, based at least in part on the determining that the second vector is within a threshold distance of the first vector, the search result candidate that has at least one term having an identical meaning to at least another term of the plurality of terms is caused to be displayed. And the at least one term and the at least another term do not structurally match. For example, referring back to FIG. 5, the word "sneakers" in the query has a same meaning as "shoes" in the search result candidate 501 even though they have a different structure.

In some embodiments, a method or process selectively refrains from causing display of another search result candidate based at least in part on the another search result candidate not being semantically similar to the query even though the another search result candidate (or term in the search result candidate) and the query (or term in the query) structurally match. For example, a user can issue the query "Brand I phone." Typical technologies would surface "Brand I phone case" based on the structurally identical terms "Brand I phone." However, "phone" and "case" are not semantically similar. Accordingly, the system would selectively refrain from causing display of "Brand I phone case" as a search result based on the entire search result candidate and the entire query not being semantically similar.

Figure 7:
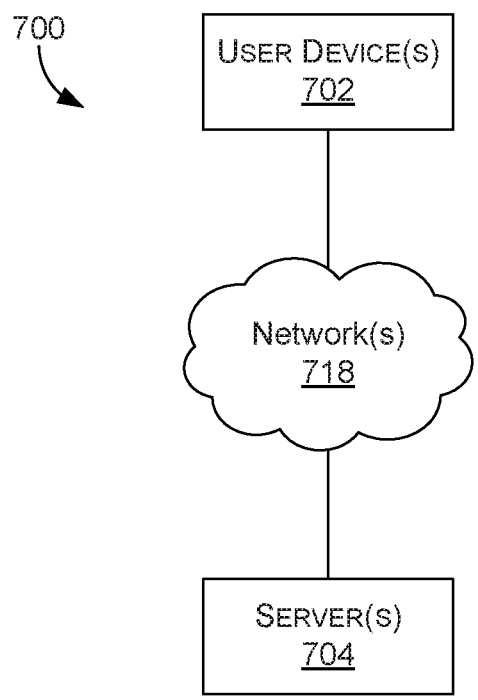
FIG. 7 is a block diagram of a computing environment in which aspects of the present technology are implemented within, according to particular embodiments.

FIG. 7 is a block diagram of a computing environment 700 in which aspects of the present disclosure are employed in, according to certain embodiments. Although the environment 700 illustrates specific components at a specific quantity, it is recognized that more or less components may be included in the computing environment 700. For example, in some embodiments, there are multiple user devices 702 and multiple servers 704, such as nodes in a cloud or distributing computing environment.

The one or more user devices 702 are communicatively coupled to the server(s) 704 via the one or more networks 718. In practice, the connection may be any viable data transport network, such as, for example, a LAN or WAN. Network(s) 718 can be for example, a local area network (LAN), a wide area network (WAN) such as the Internet, or a combination of the two, and include wired, wireless, or fiber optic connections. In general, network(s) 718 can be any combination of connections and protocols that will support communications between the control server(s) 704 and the user devices (702)

In some embodiments, a user issues a query (or selects a search result candidate) on the one or more user devices 702, after which the user device(s) 702 communicate, via the network(s) 718, to the one or more servers 704 and the one or more servers 704 executes the query and causes or provides for display one or more search result candidates back to the user device(s) 702. For example, with respect to FIG. 5, the screenshot 500 may be an example of what is displayed to the user device(s) 702 when the one or more servers 704 execute the query and causes search result to be displayed to the user device(s) 702. In some embodiments, some or each of the components of the system 100 of FIG. 1 are hosted in the one or more servers 704. Likewise, in some embodiments, some or each of the components of the system 200 of FIG. 2 are also hosted in the one or more servers 704. In some embodiments, the user device(s) 702 and/or the server(s) 704 may be embodied in any physical hardware as described with respect to FIG. 8.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 8:
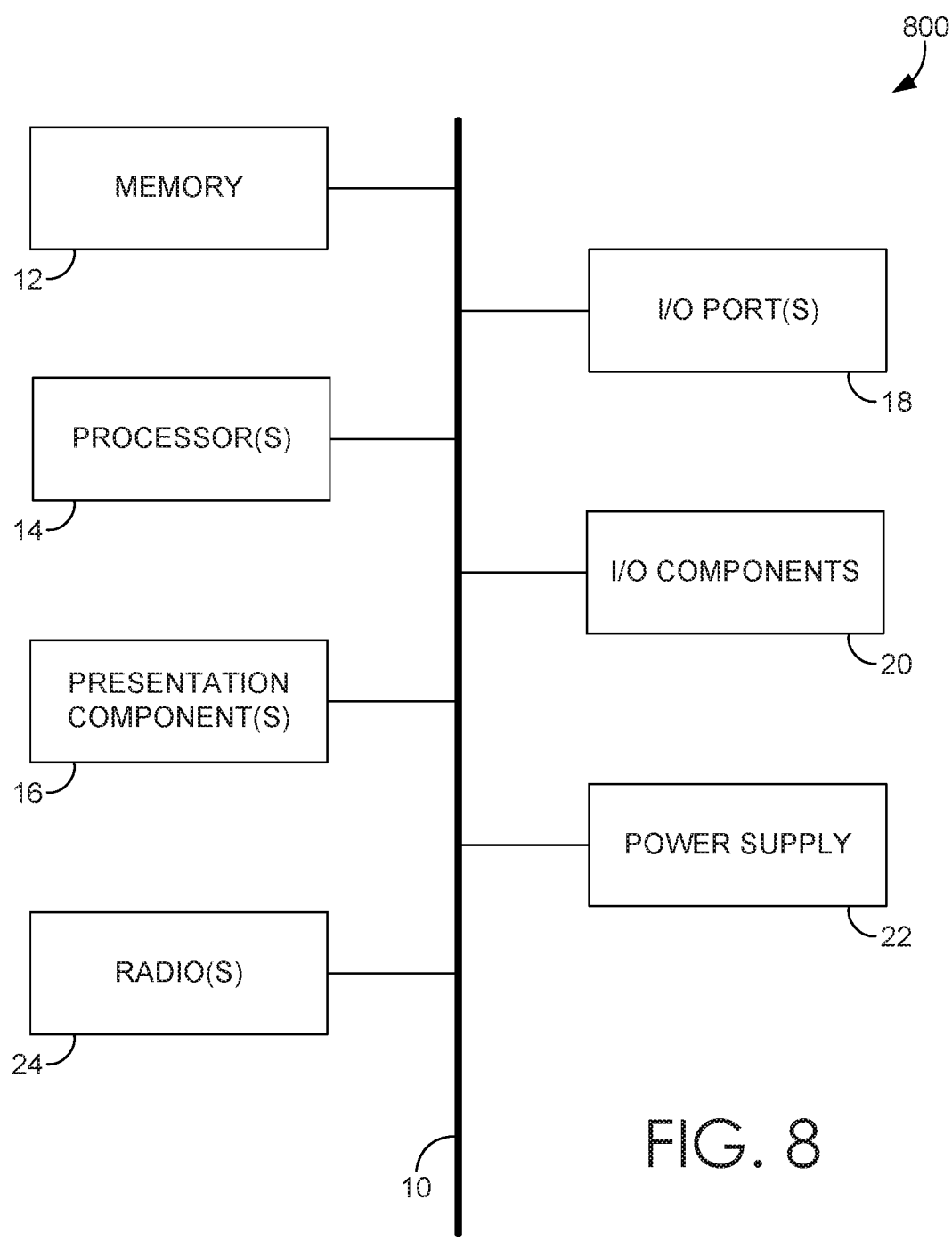
FIG. 8 is a block diagram of a computing device in which aspects of the present disclosure are implemented within, according to particular embodiments.

With reference to FIG. 8, computing device 800 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

In some embodiments, the computing device 800 represents the physical embodiments of one or more systems and/or components described above. For example, the computing device 800 can be the one or more user devices 702 and/or the server(s) 704 of FIG. 7. The computing device 800 can also perform some or each of the blocks in the processes 600 and or any functionality described herein with respect to FIGS. 1-7. It is understood that the computing device 800 is not to be construed necessarily as a generic computer that performs generic functions. Rather, the computing device 800 in some embodiments is a particular machine or special-purpose computer. For example, in some embodiments, the computing device 800 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 008 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 008 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 008. The computing device 008 may be equipped with depth cameras, such as, stereoscopic camera systems, infrared camera systems, RGB camera systems, and combinations of these for gesture detection and recognition. Additionally, the computing device 008 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

A "session" can be initiated when a user logs into a site, or is recognized by the site as returning user who is associated with activity on the site. For example, a site may recognize a returning user via cookies. A session can be considered terminated after a user logs off of a site or becomes inactive (or idle) on the site for a predetermined period of time. For example, after 30 minutes of idle time without user input (i.e., not receiving any queries or clicks), the system may automatically end a session.

What is claimed is:

1. A computer-implemented method comprising:
   receiving, at a search engine, a query for one or more items, the query includes a plurality of terms;
   generating a first vector that represents the query and a second vector that represents a search result candidate in semantic space based on a semantic similarity to one or more terms of the plurality of terms;
   processing the first vector and the second vector through a machine learning model;
   in response to the processing, converting the first vector into a first binary vector of binary values in a binary semantic space and converting the second vector into a second binary vector of binary values in the binary semantic space, wherein each term of the plurality of terms is converted into a binary value, and each binary value of the first and second binary vectors being either a zero or one;
   in response to the converting, determining a distance between the first binary vector and the second binary vector in the binary semantic space; and
   based at least in part on determining that the distance is within a threshold, causing display of the search result candidate that includes at least a first term having a same meaning as at least a second term of the query, wherein each of the first term and the second term has a different word structure.

2. The method of claim 1, further comprising:
   in response to the receiving of the query, converting each term of the plurality of terms into a vector such that there are a plurality of vectors that each contains a set of floating values; and
   mapping, prior to the determining, the plurality of vectors in the semantic space.

3. The method of claim 2, further comprising in response to the mapping of the plurality of vectors in the semantic space, converting, via running the plurality of vectors through a neural network, the plurality of vectors to a single vector, wherein the single vector is converted to the first vector.

4. The method of claim 1, running, prior to the determining, vectors representing the plurality of terms through a Long Short-term Memory (LSTM) recurrent neural network.

5. The method of claim 1, wherein the determining that the search result candidate is semantically similar to the query includes computing a hamming distance between the second binary vector and the first binary vector.

6. The method of claim 1, wherein the semantic space is an embedding that includes a plurality of vectors each representing search result candidates and queries, and wherein the query and the search result candidate share the semantic space.

7. The method of claim 1, wherein the determining that the search result candidate is semantically similar to the query is further based on computing a dot product scalar between the first vector and the second vector.

8. One or more non-transitory computer storage media having computer-executable instructions embodied thereon that, when executed, by one or more processors, cause the one or more processors to perform a method, the method comprising:
   receiving, at a search engine, a query for one or more items, the query includes a plurality of terms;
   generating a first vector that represents the query and a second vector that represents a search result candidate in semantic space based on a semantic similarity to one or more terms of the plurality of terms;
   processing the first vector and the second vector through a machine learning model;
   in response to the processing, converting the first vector into a first binary vector of binary values in a binary semantic space and converting the second vector into a second binary vector of binary values in the binary semantic space, wherein each term of the plurality of terms is converted into a binary value, and each binary value of the of the first and second binary vectors being either a zero or one;
   in response to the converting, determining whether the second binary vector is within a threshold distance of the first binary vector within the binary semantic space; and
   based at least in part on determining that the second binary vector is within the threshold distance of the first binary vector, causing display of the search result candidate that has at least one term having an identical meaning to at least another term of the plurality of terms, wherein the at least one term and the at least another term do not structurally match.

9. The computer storage media of claim 8, the method further comprising in response the receiving of the query, converting each term of the plurality of terms into a vector of floating values such there are a plurality of vectors that each contains a set of floating values.

10. The computer storage media of claim 9, the method further comprising in response to the converting each term of the plurality of terms into the vector of floating values, running the vector of floating values through a neural network, wherein the running the vector of floating values through the neural network includes combining the plurality of vectors to a single vector, each value in the single vector representing a term of the plurality of terms, and wherein the converting each term of the plurality of terms into the binary value includes changing the single vector to the first vector such that the each value in the single vector is changed to the binary value of the first vector.

11. The computer storage media of claim 8, wherein the determining that the second binary vector is within the threshold distance of the first binary vector within the binary semantic space includes using an XOR operation to compute a hamming distance between the second binary vector and the first binary vector.

12. The computer storage media of claim 8, wherein the search result candidate is indicative of a title of an item for sale in an electronic marketplace, and wherein the query is indicative of a request associated with the item.

13. The computer storage media of claim 8, the method further comprising selectively refraining from causing display of another search result candidate based at least in part on the another search result candidate not being semantically similar to the query even though the another search result candidate and the query structurally match.

14. The computer storage media of claim 8, the method further comprising running, prior to the converting, vectors representing the plurality of terms through a Long Short-term Memory (LSTM) recurrent neural network.

15. A system comprising:
one or more processors; and
one or more non-transitory computer storage media storing computer-useable instructions that, when used by the one or more processors, cause the one or more processors to perform a method, the method comprising:
receiving, at a search engine, a query that includes a plurality of terms;
generating a first vector that represents the query and a second vector that represents a search result candidate in semantic space based on a semantic similarity to one or more terms of the plurality of terms;
processing the first vector and the second vector through a machine learning model;
in response to the processing, converting the first vector that represents the query into a first binary vector of binary values in a binary semantic space and converting the second vector into a second binary vector of binary values in the binary semantic space, wherein each term of the plurality of terms is converted into a binary value, and each binary value of the first and second binary vectors being either a zero or one;
in response to the converting, determining whether the second binary vector is within a threshold distance of the first binary vector within the binary semantic space; and
based at least in part on the determining that the second binary vector is within the threshold distance of the first binary vector, causing display of the search result candidate that includes at least a first term having a same meaning as at least a second term of the query, wherein each of the first term and the second term has a different word structure.

16. The system of claim 15, wherein each binary value of the plurality of binary values represents a term or multiple terms of the plurality of terms, and wherein each term of the search result candidate is represented as another binary value within the semantic space.

17. The system of claim 15, the method further comprising, processing a second search result candidate to be processed through another neural network and responsively generating a third binary vector in the binary semantic space, the third binary vector including another plurality of binary values.

18. The system of claim 15, wherein the semantic space originally exists as an embedding of vectors that represent single words prior to the generating of the first vector.

19. The system of claim 15, wherein the determining includes computing a hamming distance between the first binary vector and the second binary vector.

20. The system of claim 15, wherein the processing is through a Long Short Term Memory (LSTM) neural network.

* * * * *